United States Patent
Soderlind

(10) Patent No.: US 11,014,574 B2
(45) Date of Patent: May 25, 2021

(54) SYSTEM AND METHOD FOR HANDLING LIGHT SOURCE IMPAIRMENT

(71) Applicant: VOLVO CAR CORPORATION, Gothenburg (SE)

(72) Inventor: Andre Soderlind, Hinsings Backa (SE)

(73) Assignee: VOLVO CAR CORPORATION, Gothenburg (SE)

( * ) Notice: Subject to any disclaimer, the term of this patent is extended or adjusted under 35 U.S.C. 154(b) by 302 days.

(21) Appl. No.: 16/020,098

(22) Filed: Jun. 27, 2018

(65) Prior Publication Data

US 2019/0009792 A1    Jan. 10, 2019

(30) Foreign Application Priority Data

Jul. 6, 2017    (EP) .................................... 17180036

(51) Int. Cl.
*B60W 50/12*    (2012.01)
*B60K 28/06*    (2006.01)
(Continued)

(52) U.S. Cl.
CPC .......... *B60W 50/085* (2013.01); *B60W 30/09* (2013.01); *B60W 30/12* (2013.01);
(Continued)

(58) Field of Classification Search
CPC ...... B60W 30/12; B60W 30/09; B60W 50/12; B60W 50/085; B60W 2710/30;
(Continued)

(56) References Cited

U.S. PATENT DOCUMENTS 7,167,796 B2 *    1/2007    Taylor ...................... B60R 1/12
                                                                701/431
8,169,684 B2 *    5/2012    Bugno .................... B60R 1/088
                                                                359/267
(Continued)

FOREIGN PATENT DOCUMENTS

CN    101109957 A    1/2008
CN    101913356 A    12/2010
(Continued)

OTHER PUBLICATIONS

Vision based lane keeping assistance control triggered by a driver inattention monitor; Özgür Tunçer;Levent Güvenç;Fuat Coşkun; Elif Karsligil; 2010 IEEE International Conference on Systems, Man and Cybernetics; Year: 2010; IEEE Conference Paper (Year: 2010).*

(Continued)

Primary Examiner — Cuong H Nguyen
(74) Attorney, Agent, or Firm — Brooks Kushman P.C.

(57) ABSTRACT

Embodiments herein relate to a method for handling light source impairment. The position of a user's eye(s) when the user is inside the vehicle is obtained. The position of a light source outside the vehicle and an intensity of light from the light source in relation to the position of the user's eye(s) is obtained. Then, it is determined whether the user's vision is impaired by the light source. The determining is done based on whether there is a line of sight between the light source and the user's eye(s), and based on the intensity of light at the user's eye(s). It is determined whether at least one safety measure should be performed by the vehicle based on whether the user's vision is impaired by the light source.

14 Claims, 5 Drawing Sheets

(51) Int. Cl.
  *B60W 50/08* (2020.01)
  *B60W 30/12* (2020.01)
  *B60W 30/09* (2012.01)
  *G06K 9/00* (2006.01)
  *G01J 1/42* (2006.01)
  *G05D 1/00* (2006.01)
(52) U.S. Cl.
  CPC .............. *G01J 1/42* (2013.01); *G05D 1/0061* (2013.01); *G06K 9/00832* (2013.01); *B60W 2420/42* (2013.01); *B60W 2540/22* (2013.01); *B60W 2540/26* (2013.01); *B60W 2555/20* (2020.02); *B60W 2710/30* (2013.01); *G01J 2001/4266* (2013.01)
(58) Field of Classification Search
  CPC ....... B60W 2540/26; B60W 2540/221; B60W 2555/20; B60W 2540/22; B60W 2540/42; B60W 30/05; G01J 2001/4266; G01J 1/42; G05D 1/0061; G05D 1/0038; G05D 1/0055; B60R 1/00; B60R 2300/105; B60K 28/06; B60J 3/04
  USPC .................... 701/23; 382/275; 340/995.28
  See application file for complete search history.

(56) References Cited

U.S. PATENT DOCUMENTS

| | | | | |
|---|---|---|---|---|
| 8,559,092 B2* | 10/2013 | Bugno | ............... | G02F 1/161 |
| | | | | 359/265 |
| 8,704,653 B2* | 4/2014 | Seder | ............... | G01S 13/723 |
| | | | | 340/461 |
| 9,056,584 B2* | 6/2015 | Fish, Jr. | ............... | G02F 1/157 |
| 9,134,585 B2* | 9/2015 | Tonar | ............... | G02F 1/161 |
| 9,448,449 B2* | 9/2016 | Ramanathan | ............... | B60R 1/088 |
| 9,701,248 B2* | 7/2017 | Neuman | ............... | G02F 1/161 |
| 9,789,821 B2* | 10/2017 | Baur | ............... | G08G 1/09623 |
| 10,191,348 B2* | 1/2019 | Luten | ............... | B60R 1/025 |
| 2004/0128065 A1* | 7/2004 | Taylor | ............... | B60Q 1/2665 |
| | | | | 701/431 |
| 2006/0140502 A1* | 6/2006 | Tseng | ............... | B60R 1/00 |
| | | | | 382/275 |
| 2009/0168185 A1 | 7/2009 | Augustine | | |
| 2010/0253540 A1* | 10/2010 | Seder | ............... | G01S 13/867 |
| | | | | 340/905 |
| 2014/0091989 A1 | 4/2014 | Szczerba et al. | | |
| 2014/0092332 A1 | 4/2014 | Price | | |
| 2014/0211114 A1* | 7/2014 | Ramanathan | ............... | G02F 1/1347 |
| | | | | 349/33 |
| 2019/0154439 A1* | 5/2019 | Binder | ............... | G01S 15/08 |

FOREIGN PATENT DOCUMENTS

| | | |
|---|---|---|
| CN | 204222597 U | 3/2015 |
| CN | 104637299 A | 5/2015 |
| WO | 2014/195821 A1 | 12/2014 |

OTHER PUBLICATIONS

An abstract of "Examining senior drivers adaptation to mixed level automated vehicles: A naturalistic study"; D Liang, JF Antin, NK Lau, KE Stulce, SA Baker; Aug. 2019—from https://vtechworks.lib.vt.edu (Year: 2019).*

Developing Predictive Models of Driver Behaviour for the Design of Advanced Driving Assistance Systems; SM Zabihi—Mar. 2, 2017—from https://ir.lib.uwo.ca; (Year: 2017).*

Extended European Search Report dated Feb. 1, 2018, Application No. 17180036.0-1012, Applicant Volvo Car Corporation, 8 Pages.

First Office Action for Chinese Application No. 201810685608.0, dated Dec. 3, 2020, 7 Pages.

* cited by examiner

SYSTEM AND METHOD FOR HANDLING LIGHT SOURCE IMPAIRMENT

CROSS-REFERENCE TO RELATED APPLICATIONS

This application claims foreign priority benefits under 35 U.S.C. § 119(a)-(d) to European patent application number EP 17180036.0, filed Jul. 6, 2017, which is incorporated by reference in its entirety.

TECHNICAL FIELD

Embodiments herein relate generally to a system, a method, and a vehicle at least partly comprising the system. More particularly the embodiments herein relate to handling light source impairment.

BACKGROUND

When being subject to bright light, humans may experience difficulty in seeing things. This may also be referred to as glare or dazzle. The bright light received may be perceived as uncomfortable by the person. Several car accidents are caused by a user that was distracted by the sun, oncoming headlights or other light sources. Some figures say that 2,575 accidents out of 108,211 are caused by dazzling sun. With active safety systems in the vehicles, several of these accidents are prevented today.

If a user of the vehicle is dazzled by e.g., the sun, the sun can be blocked at the particular windscreen position where it is visible to the user. For example, the windscreen may be a smart windscreen where a selectable part can be darkened in order to block the sun at the particular position. Another counter measure may be to activate another suitable safety system that is deactivated.

After a blinding glare is removed, an after-image remains on the eye's retina that creates a blind spot for the user. This phenomenon, known as the Troxler Effect, has been found to postpone user reaction time by up to 1.4 seconds.

Therefore, there is a need to at least mitigate or solve the issue that users' vision are impaired by light sources in order to reduce the amount of accidents caused by this.

SUMMARY

An objective of embodiments herein is therefore to obviate at least one of the above disadvantages and to provide improved handling of light source impairment in a vehicle.

According to a first aspect, the object is achieved by a method for handling light source impairment performed by a system at least partly comprised in a vehicle. The position of a user's eye(s) when the user is inside a vehicle is obtained. A position of a light source outside the vehicle and an intensity of light from the light source in relation to the position of the user's eye(s) are also obtained. Then, it is determined whether the user's vision is impaired by the light source. The determining is done based on whether there is a line of sight between the light source and the user's eye(s), and also based on the intensity of the light at the user's eye. A decision is taken by the vehicle whether at least one safety measure should be performed based on whether the user's vision is impaired by the light source.

According to a second aspect, the object is achieved by a system at least partly comprised in a vehicle for handling light source impairment. The system is configured to obtain a position of a user's eye(s) when the user is inside a vehicle. The system is further configured to obtain a position of a light source outside the vehicle and an intensity of light from the light source in relation to the position of the user's eye(s). The system is also configured to determine whether the user's vision is impaired by the light source. Determination is done based on whether there is a line of sight between the light source and the user's eye(s), and based on the intensity of the light at the user's eye. The system is configured to determine whether at least one safety measure should be performed by the vehicle based on whether the user's vision is impaired by the light source.

According to a third aspect, the object is achieved by a vehicle at least partly comprising the system according to the second aspect.

Since it is determined whether the user's vision is impaired by the light source based on whether there is a line of sight between the light source and the user's eye(s), and based on the intensity of the light at the user's eye(s), it is possible to determine whether at least one safety measure should be performed by the vehicle. Thus, handling of light source impairment in a vehicle is improved.

Embodiments herein afford many advantages, of which a non-exhaustive list of examples follows:

An advantage of the embodiments herein is that the vehicle can perform at least one safety measure if the user's vision is impaired by the light source in order to avoid accidents and to provide a comfortable ride.

Another advantage of the embodiments is that by combining both the eye(s) position the light source position and light intensity, the decision regarding impairment is improved compared to using only one of the parameters.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the attached drawings.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
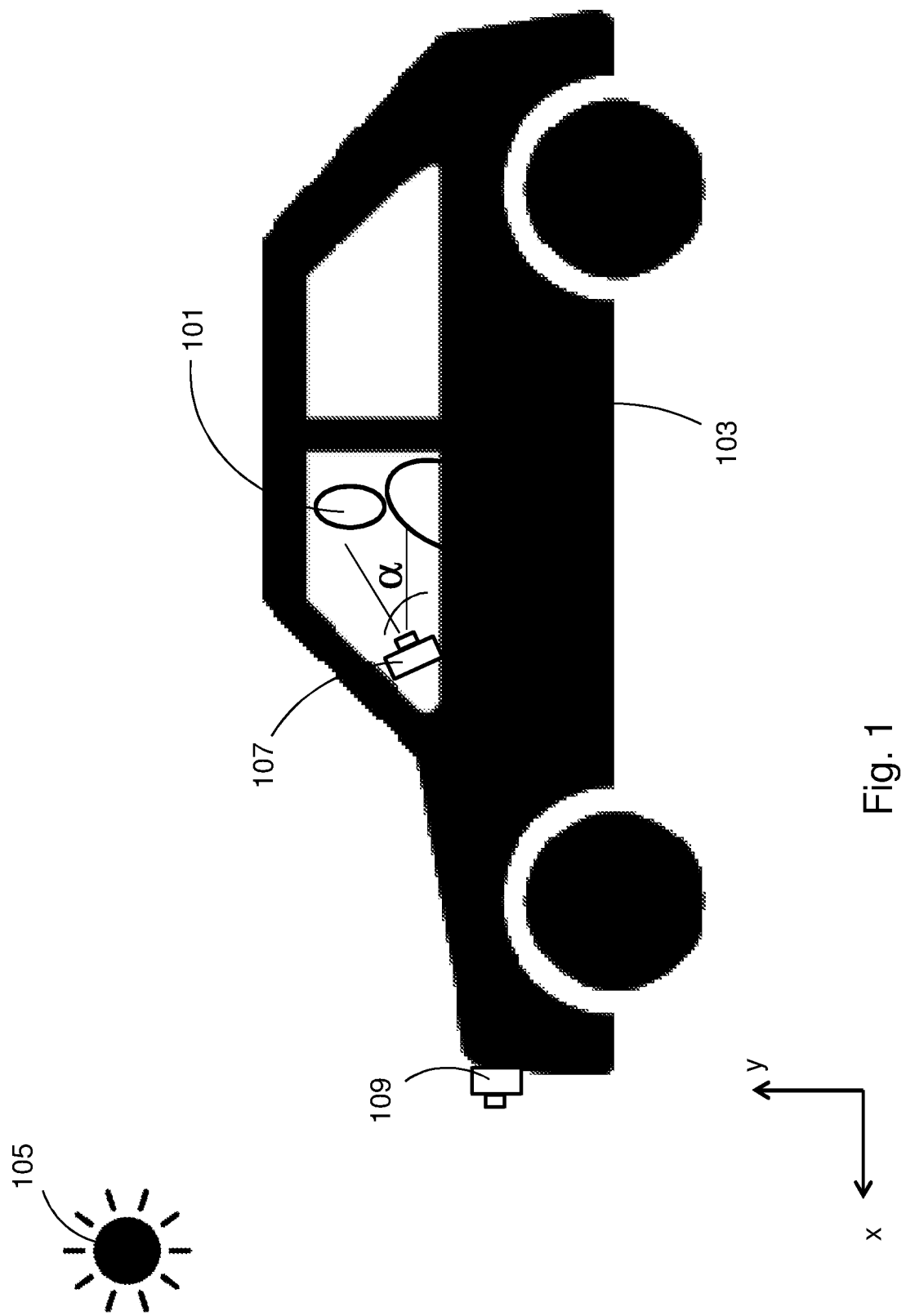
FIG. 1 is a schematic drawing illustrating a vehicle.

FIG. 1 illustrates a user 101 of a vehicle 103. The user 101 is illustrated in FIG. 1 as to be located inside the vehicle 103. The vehicle 103 may be any arbitrary vehicle, for instance a car, truck, lorry, van, bus, motorcycle, etc. The vehicle 103 may be at least partly autonomous or self-driven, it may be non-autonomous, or it may be completely autonomous, etc. The vehicle 103 has a windscreen which is at least partly transparent, and through which the user 101 looks forward and through which it also can receive light from a light source 105. The light source 105 is located outside the vehicle 103. The light source 105 may be the sun, oncoming headlights from other vehicles, other light sources in the surroundings outside the vehicle 130, etc.

The user 101 may be a driver of the vehicle 103 or he may be a passenger or occupant of the vehicle 103. The user 101 may also be referred to as an operator of the vehicle 103.

FIG. 1 also illustrates a coordinate system having an x and y axis. When the surface on which the vehicle 103 is positioned is flat, the x-axis follows the surface (e.g., the road) on which the vehicle 103 is positioned. Increasing x coordinates represent the forward moving direction of the vehicle 103. The y-axis is perpendicular to the x-axis. This coordinate system is also illustrated in some of the other figures.

The vehicle 103 comprises one or more user monitoring devices 107 and one or more forward-looking devices 109. These devices 107, 109 may also be referred to as sensors, measuring devices, instruments, apparatus', camera, image capturing device, monitoring device, etc.

The user monitoring device 107 is mounted inside and/or outside the vehicle 103 and in a position such that it can monitor (e.g., by filming, by taking pictures, etc.) the user 101, and in particular at one or both of the user's 101 eyes, or any other suitable point in relation to the eye(s), e.g., a point between the eyes. The user monitoring device 107 may be mounted for example on the steering wheel inside the vehicle 103, it may be mounted in the roof, it may be mounted inside or outside the windscreen, etc. In case there are two or more user monitoring devices 107, the may be positioned at different positions in the vehicle 103 in order to monitor the user 101 from different angles. α in FIG. 1 represents the recording angle of the user monitoring device 107 with respect to the x-axis.

The forward-looking device 109 is in a position such that it can monitor at least what happens in the forward driving direction of the vehicle 103. The forward-looking device 109 may also be adapted to monitor at least part of what happens at the sides of the vehicle 103, e.g., when the forward-looking device is a 109 wide angle camera. Thus, the forward-looking device 109 may be arranged to obtain data from any direction(s) with respect to the vehicle 103 and need to necessarily be permanently forward looking. The forward-looking device 109 may be mounted inside or outside the vehicle 103. The forward-looking device 109 may be mounted for example on the vehicle's grill, on the roof of the vehicle 103, inside or outside the windscreen, etc. In case there are two or more forward-looking devices 109, they may be mounted at different positions, for example one on the left side of the grill and the other on the right side of the grill.

In some embodiments, the user monitoring device 107 and the forward-looking device 109 are co-located in one device, where one part of the device is adapted to monitor the user and another part of the device is adapted to look forward of the vehicle 103.

The forward-looking device 109 is adapted to detect at least one of the following parameters of the light source 105:
   Light source position (Light source elevation and/or light source azimuth).
   Light source intensity.

Figure 2:
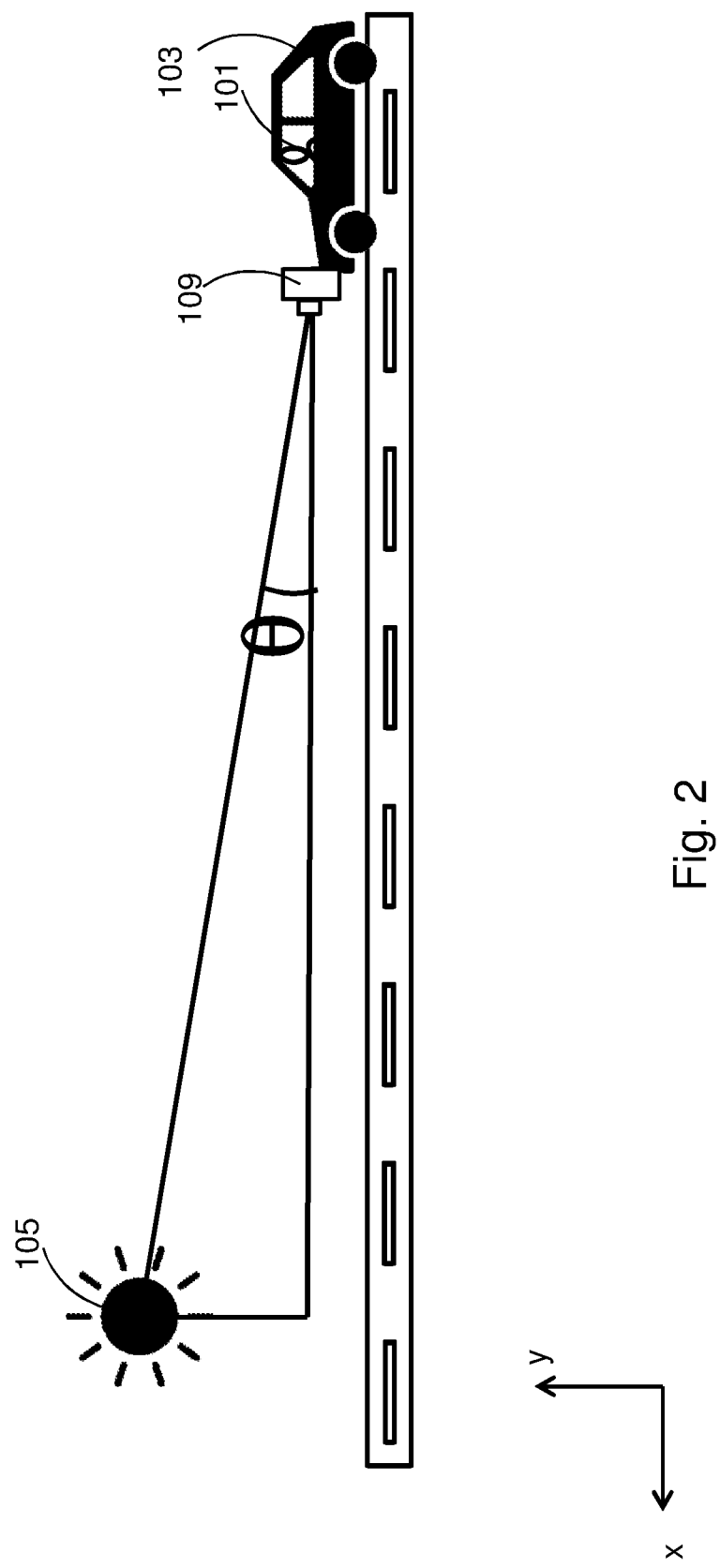
FIG. 2 is a schematic drawing illustrating light source elevation.

FIG. 2 illustrates the light source altitude as detected by the forward-looking device 109, where the θ represents the elevation angle between the light and the horizon when it is recorded by the forward-looking device 109. In other words, θ represents how high the sun is above the surface on which the vehicle 103 is positioned.

Figure 3:
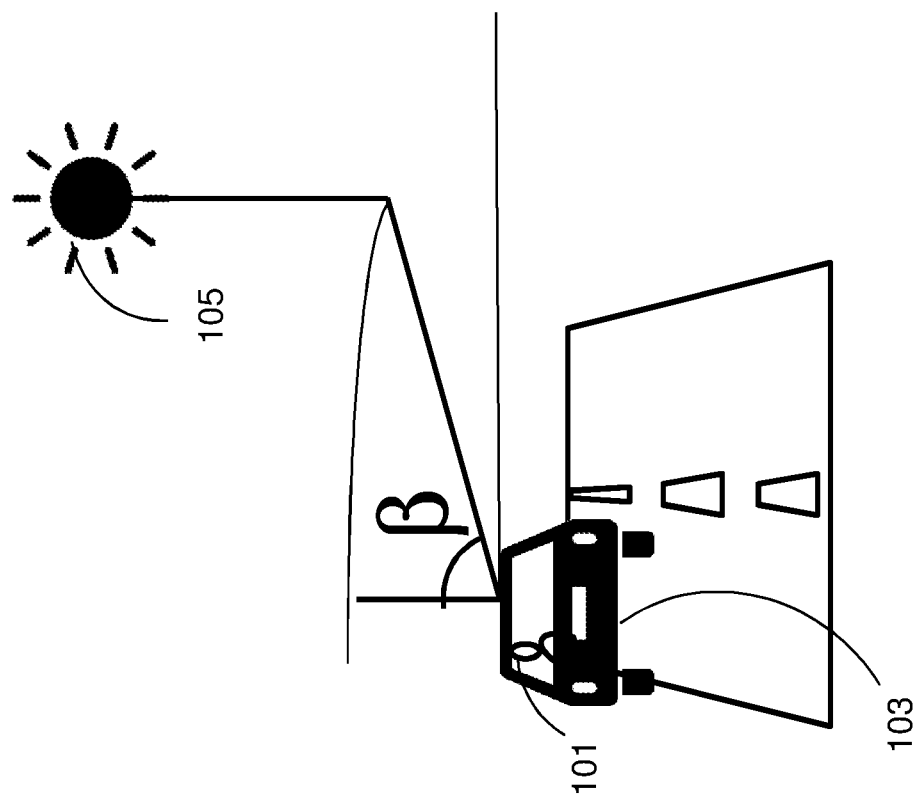
FIG. 3 is a schematic drawing illustrating light source azimuth.

FIG. 3 illustrates the light source azimuth that represents the horizontal angle between the light source and the direction of the vehicle 103 when it is recorded by the forward-looking device 109. In other words β in FIG. 3 represents the azimuth.

The light source elevation and the light source azimuth together provide the position of the light source 105 in relation to the vehicle 103.

The light source intensity may be detected and measured in any suitable scale, e.g., lumen, $W/m^2$, etc. Intensity may also be described as a measure of how bright the light from the light source 105 is perceived by the user 101. The light source intensity is associated with the distance between the light source 105 and the vehicle 103 and its user 101. For example, a light source 105 which is far away from the vehicle 103 may have an intensity which is perceived by the user 101 as lower compared to a light source 105 which is close to the vehicle 103.

As mentioned above, with the user monitoring device 107, it is possible to detect the eye position in space, to detect a tired user 101, based on e.g., eye opening size and blinking. However, with only the user monitoring device 107, it is hard to distinguish between a tired user 101 and user 101 who is squinting because of a light source 105. By combining information about user's eye(s) position in space and the light source position and intensity, is it possible to determine if the user's 101 vision is impaired by the light source 105.

With information about the light source's position and the user's eye(s) position it is possible to calculate exactly the light source location in regards to the user's eye(s). This may be done constantly, periodically or on demand. With information about that and the light intensity it is possible to determine if the light source 105 is a disturbance or not to the user 101.

Combining information about the light intensity and position with information about the user's eye(s) position it is possible to determine that the user's vision is impaired by the light source 105 and perform at least one safety measure such as enabling the vehicles Lane Keeping Aid if not enabled, increase the parameter user reaction time that is used as input for Collision Mitigation by Braking and therefore have earlier interventions, etc.

The method for handling light source 105 impairment, according to some embodiments will now be described with reference to the flowchart in FIG. 4. The method comprises at least one of the following steps, which steps may as well be carried out in another suitable order than described below.

Step 301

The position of a user's 101 eye(s) when the user 101 is inside a vehicle 103 is obtained. The position may be of one of the user's eyes or both, or a position associated with the eye(s) (e.g., a position between the eyes). The position may be in relation to the vehicle 101. The position may be in the form of points in the xy-coordinate system illustrated in FIGS. 1-3.

The position of the user's 101 eye(s) may be obtained from a user monitoring device 107 comprised in the vehicle 103.

Step 302

A position of a light source 105 outside the vehicle 103 is obtained, and also the intensity of light from the light source 105 in relation to the position of the user's eye(s) is obtained.

The position of the light source 105 may comprise at least one of azimuth and elevation information of the light source 105 in relation to the position of the user's eye(s).

The position of the light source 105 and the intensity of light from the light source 105 may be obtained from a forward-looking device 109 comprised in the vehicle 103.

Step 303

It is determined whether the user's 101 vision is impaired by the light source 105. Determination is done based on whether there is a line of sight between the light source 105 and the user's eye(s), and based on the intensity of the light at the user's eye(s). In order to determine this, the eye(s) position is compared with the light source position. It is determined whether there is a line of sight from the light source 105 to the user's eye(s), i.e., whether electromagnetic waves can travel in a line from the light source 105 to the user's eye(s). The line of sight may be a direct line of sight or a partly-direct line of sight. In addition, the light intensity at the user's eye(s) is compared to a threshold. If the light intensity is on or above a threshold, the light from the light source 105 is so strong that it is deemed to be uncomfortable for the user 101. If the light intensity is below the threshold, the light from the light source is not uncomfortable for the user 101.

Table 1 below provides an overview of some example scenarios that may occur:

TABLE 1

| Line of sight? | Is light intensity on or above intensity threshold? | Is user's vision impaired? |
|---|---|---|
| Yes | On or above | Yes |
| Yes | Below | Yes |
| Yes | Below | No |
| No | On or above | Yes |
| No | Below | No |

Step 304

Based on whether the user's vision is impaired by the light source 105 (i.e., based on the decision in step 303), it is determined whether at least one safety measure should be performed by the vehicle 103. For example, at least one safety measure should be performed if the user's 101 vision is impaired, and at least one safety measures should not be performed if the user's 101 vision is not impaired.

TABLE 2

| Line of sight? | Is light intensity on or above intensity threshold? | Is user's vision impaired? | Perform safety measure? |
|---|---|---|---|
| Yes | On or above | Yes | Yes |
| Yes | Below | Yes | Yes |
| Yes | Below | No | No |
| No | On or above | Yes | Yes |
| No | Below | No | No |

In another example, a degree of impairment may be evaluated in order to determine whether at least one safety measure should be performed, for example if the impairment is on, above or below an impairment threshold. Some example scenarios are provided in Table 3 below.

TABLE 3

| Line of sight? | Is light intensity on or above intensity threshold? | Is user's vision impaired? | Is impairment on, above or below threshold? | Perform safety measures? |
|---|---|---|---|---|
| Yes | On or above | Yes | On or above | Yes |
| Yes | Below | Yes | On or above | Yes |
| Yes | Below | No | Below | No |
| No | On or above | Yes | On or above | Yes |
| No | Below | No | Below | No |

It may also be determined which at least one safety measure that should be performed, or which class the performed safety measure should belong to. Thus, the safety measures may be divided into classes, e.g., a first class and a second class. For example, the first class may comprise at least one safety measure that can be performed by the vehicle 103 because the user's 101 vision is impaired to the degree that he is not able to see due to the dazzle. The second class may comprise at least one safety measure that can be performed because the user's vision is impaired to the degree that the light is only uncomfortable, but he is still able to see with his eye(s). Table 4 below provides an overview of some examples of whether or not to perform at least one safety measure, and the class of the measure.

TABLE 4

| Line of sight? | Is light intensity on or above intensity threshold? | Is user's vision impaired? | Perform safety measure? | Which safety measure? |
|---|---|---|---|---|
| Yes | On or above | Yes | Yes | Class 1 |
| Yes | Below | Yes | Yes | Class 1 |
| Yes | Below | No | Maybe | Class 2 or no |
| No | On or above | Yes | Yes | Class 1 |
| No | Below | No | Maybe | Class 2 or no |

The at least one safety measure comprises at least one of: enabling a lane keeping aid in the vehicle 103, increasing a user reaction time parameter used by a collision mitigation system in the vehicle 103, and denying handing control of the vehicle 103 back to the user 101 when the vehicle 103 is an autonomous vehicle.

Figure 4:
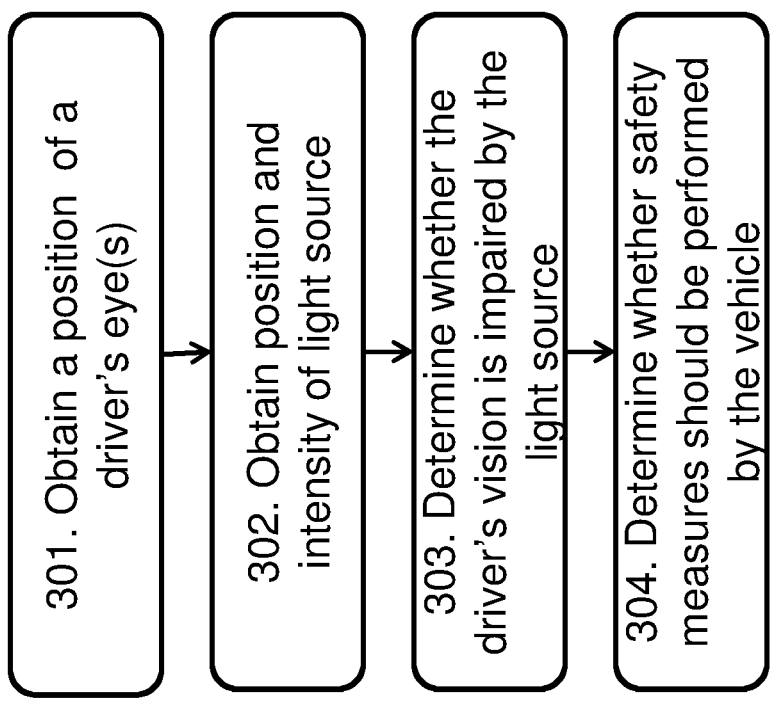
FIG. 4 is a flow chart illustrating embodiments of a method.
Figure 5:
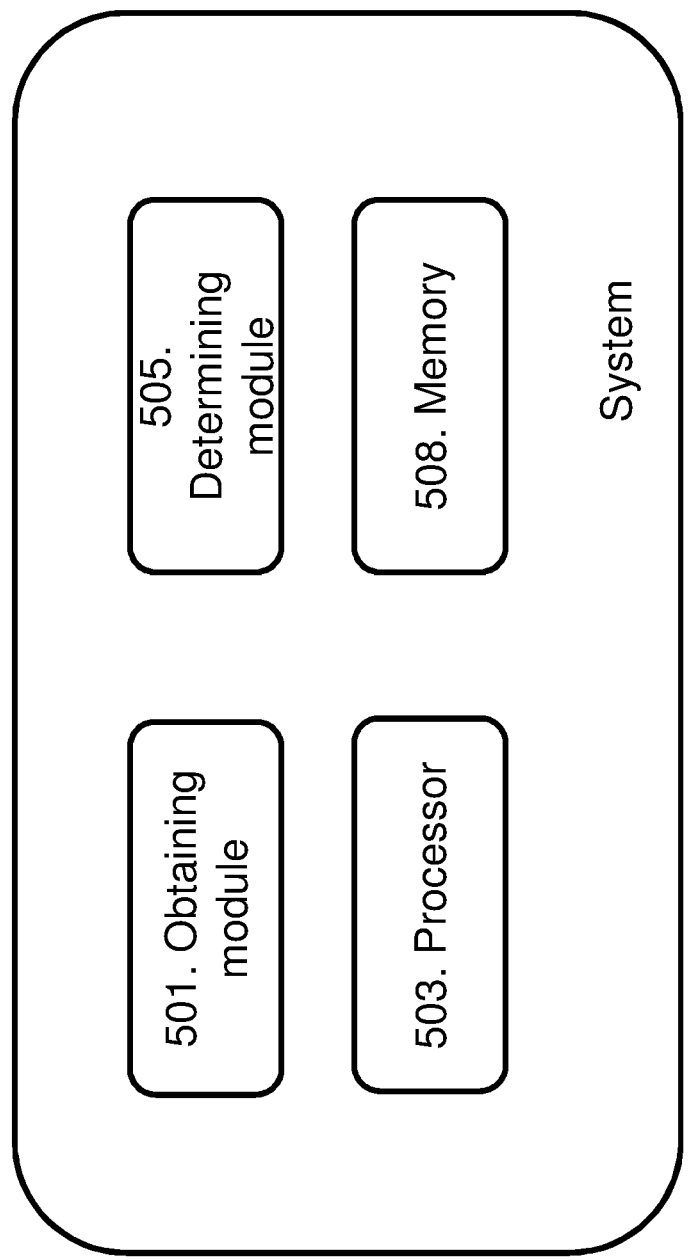
FIG. 5 is a schematic block diagram illustrating embodiments of a system.

To perform the method steps shown in FIG. 4 for handling light source 105 impairment, a system may comprise an arrangement as shown in FIG. 5. The system may be at least partly comprised in the vehicle 103.

The system is configured to, e.g., by means of an obtaining module 501, obtain a position of a user's 101 eye(s) when the user 101 is inside a vehicle 103. The position of the user's 101 eye(s) may be obtained from a user monitoring device 107 comprised in the vehicle 103, for example by receiving position information. The obtaining module 501 may also be referred to as an obtaining unit, an obtaining means, an obtaining circuit, means for obtaining, etc. The obtaining module 501 may be a processor 503 of the system.

The system is further configured to, e.g., by means of the obtaining module 501, obtain a position of a light source 105 outside the vehicle 103 and an intensity of light from the light source 105 in relation to the position of the user's 101 eye(s). The position of the light source 105 may comprise at least one of azimuth and/or elevation information of the light source 105 in relation to the position of the user's eye(s). The position of the light source 105 and the intensity of light from the light source 105 may be obtained from a forward-looking device 109 comprised in the vehicle 103, e.g., by receiving position and intensity information from the forward-looking device 109.

The system is further configured to, e.g., by means of a determining module 505, determine whether the user's 101 vision is impaired by the light source 105. The determining is done based on whether there is a line of sight between the light source 105 and the user's eye(s), and based on the intensity of the light at the user's eye(s). The determining module 505 may also be referred to as a determining unit, a determining means, a determining circuit, means for determining, etc. The determining module 505 may be the processor 503 of the system.

The system is further configured to, e.g., by means of the determining module 505, determine whether at least one safety measure should be performed by the vehicle 103 based on whether the user's vision is impaired by the light source 105. The at least one safety measure may comprise at least one of: enabling a lane keeping aid in the vehicle 103, increasing a user reaction time parameter used by a collision mitigation system in the vehicle 103, and denying handing control of the vehicle back to the user 101 when the vehicle 103 is an autonomous vehicle. The at least one safety measure may be performed if the user's 101 vision is impaired by the light source 105 to a degree which is equal to or above a threshold. The at least one safety measure may not be performed if the user's 101 vision is not impaired by the light source 105 or if it is impaired by the light source 105 to a degree below a threshold.

In some embodiments, the system comprises a memory 508. The memory 508 comprises instructions executable by the processor 503. The memory 508 is arranged to be used to store data, position information, intensity information, safety measure information, match information, threshold values, time periods, configurations, schedulings, and applications to perform the methods herein when being executed in the system.

The present mechanism for handling light source 105 impairment may be implemented through one or more processors, such as a processor 503 in the system depicted in FIG. 5, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the system. One such carrier may be in the form of a CD ROM disc. It is however feasible with other data carriers such as a memory stick. The computer program code can furthermore be provided as pure program code on a server and downloaded to the system.

In some embodiments, a computer program may comprise instructions which, when executed on at least one processor, cause the at least one processor to carry out the method steps in FIG. 3. A carrier may comprise the computer program, and the carrier is one of an electronic signal, optical signal, radio signal or computer readable storage medium.

Summarized, when a light source 105 such as the sun is standing low and in front of the user's 101 vision will be impaired by sun glare. The user 101 can also be dazzled by other strong light sources, like an oncoming vehicle at night with high beams on. By using a vehicle sensor that detects light source intensity and location in addition to a user monitoring device 107, it is possible to determine that the user's 101 vision is impaired by the light source 105 and perform at least one safety measure. With this, it also possible to differ if user 101 is tired or squinting because of the light source 105. The impairment may also be described as the user 101 being "unavailable" due to the light. Sensors, such as the user monitoring device 107 and the forward-looking device 109 are not impaired by the light. It is the user's vision that is impaired. The user's 101 unavailability is used to determine if the user 101 is in the loop (can make correct decisions), if he is determined to be out of the loop due to being dazzled by the light source 106, at least one safety measure is performed. In addition, if the vehicle 103 is driving autonomously and control of the vehicle 103 has to be returned to the user 101, the fact that if his vision is impaired by the light source 105 may have to be considered as a risk.

The embodiments herein are not limited to the above described embodiments. Various alternatives, modifications and equivalents may be used. Therefore, the above embodiments should not be taken as limiting the scope of the embodiments, which is defined by the appending claims. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "configured to" used herein may also be referred to as "arranged to", "adapted to", "capable of" or "operative to".

It should also be emphasized that the steps of the methods defined in the appended claims may, without departing from the embodiments herein, be performed in another order than the order in which they appear in the claims.

What is claimed is:

1. A method for handling light source impairment performed by a system at least partly comprised in a vehicle, the method comprising:
    obtaining a position of a user's eye(s) when the user is inside the vehicle;
    obtaining a position of a light source outside the vehicle and an intensity of light from the light source in relation to the position of the user's eye(s); and
    determining whether the user's vision is impaired by the light source, wherein the determining is done based on whether there is a line of sight between the light source and the user's eye(s), and based on the intensity of light at the user's eye(s); and
    determining whether at least one safety measure should be performed by the vehicle based on whether the user's vision is impaired by the light source, wherein the at least one safety measure comprises at least one of: enabling a lane keeping aid in the vehicle, increasing a user reaction time parameter used by a collision mitigation system in the vehicle, and denying handing control of the vehicle back to the user when the vehicle is an autonomous vehicle.

2. A vehicle comprising:
    a system for handling light source impairment, the system being configured to:
        obtain a position of a user's eye(s) when the user is inside a vehicle;

obtain a position of a light source outside the vehicle and an intensity of light from the light source in relation to the position of the user's eye;

determine whether the user's vision is impaired by the light source, wherein determination is done based on whether there is a line of sight between the light source and the user's eye(s), and based on the intensity of light at the user's eye(s); and determine whether at least one safety measure should be performed by the vehicle based on whether the user's vision is impaired by the light source, wherein the at least one safety measure comprises at least one of: enabling a lane keeping aid in the vehicle, increasing a user reaction time parameter used by a collision mitigation system in the vehicle, and denying handing control of the vehicle back to the user when the vehicle is an autonomous vehicle;

wherein the system comprises:

a sensor mountable in the vehicle and usable to obtain the position of the user's eye(s), and a forward-looking sensor that is mountable on the vehicle and usable to obtain the position of the light source and the intensity of the light from the light source.

3. The method according to claim 1 wherein the at least one safety measure should be performed if the user's vision is impaired by the light source to a degree which is equal to or above a threshold.

4. The method according to claim 1 wherein the at least one safety measure is not performed if the user's vision is not impaired by the light source or if it is impaired by the light source to a degree below a threshold.

5. The method according to claim 1 wherein the position of the light source is obtained by obtaining at least one of azimuth and/or elevation information of the light source in relation to the position of the user's eye(s).

6. The method according to claim 1 wherein the position of the user's eye(s) is obtained from a user monitoring device comprised in the vehicle.

7. The method according to claim 1 wherein the position of the light source and the intensity of light from the light source are obtained from a forward-looking device comprised in the vehicle.

8. The method according to claim 1 wherein obtaining the position of the user's eye(s) is performed using a sensor mounted in the vehicle.

9. The method according to claim 1 wherein obtaining the position of the light source and the intensity of the light from the light source are performed using a forward-looking sensor mounted on the vehicle.

10. The method according to claim 1 wherein the determining steps are performed by a system mounted on the vehicle, the system including at least one processor and a non-transient computer readable storage medium having stored thereon instructions that are executable by the at least one processor to determine whether the user's vision is impaired by the light source, and to determine whether the at least one safety measure should be performed by the vehicle.

11. A system for handling light source impairment, the system being configured to:

obtain a position of a user's eye(s) when the user is inside a vehicle;

obtain a position of a light source outside the vehicle and an intensity of light from the light source in relation to the position of the user's eye;

determine whether the user's vision is impaired by the light source, wherein determination is done based on whether there is a line of sight between the light source and the user's eye(s), and based on the intensity of light at the user's eye(s); and determine whether at least one safety measure should be performed by the vehicle based on whether the user's vision is impaired by the light source, wherein the at least one safety measure comprises at least one of: increasing a user reaction time parameter used by a collision mitigation system in the vehicle and denying handing control of the vehicle back to the user when the vehicle is an autonomous vehicle.

12. The system according to claim 11 wherein the system comprises a sensor mountable in the vehicle and usable to obtain the position of the user's eye(s), and a forward-looking sensor that is mountable on the vehicle and usable to obtain the position of the light source and the intensity of the light from the light source.

13. The system according to claim 12 wherein at least one of the sensor and the forward-looking sensor comprises a camera.

14. The system according to claim 12 further comprising at least one processor and a non-transient computer readable storage medium having stored thereon instructions that are executable by the at least one processor to determine whether the user's vision is impaired by the light source, and to determine whether the at least one safety measure should be performed by the vehicle.

* * * * *